United States Patent [19]
Collin

[11] 4,363,132
[45] Dec. 7, 1982

[54] DIVERSITY RADIO TRANSMISSION SYSTEM HAVING A SIMPLE AND ECONOMICAL STRUCTURE

[75] Inventor: Claude Collin, Paris, France
[73] Assignee: Thomson-CSF, Paris, France
[21] Appl. No.: 228,724
[22] Filed: Jan. 27, 1981
[30] Foreign Application Priority Data
Jan. 29, 1980 [FR] France ................. 80 01898
[51] Int. Cl.³ ................................ H04B 7/02
[52] U.S. Cl. ...................... 455/52; 455/44; 455/61; 455/101; 455/102; 375/40
[58] Field of Search ............ 455/42, 45, 44, 52, 455/59, 61, 102, 110, 101; 179/1 GS; 332/22; 370/11; 375/40, 44, 51, 1

[56] References Cited
U.S. PATENT DOCUMENTS

| | | | |
|---|---|---|---|
| 3,023,309 | 2/1962 | Foulkes | 455/102 |
| 3,258,694 | 6/1966 | Shepperd | 455/44 |
| 3,689,841 | 9/1972 | Bello et al. | 370/11 |
| 3,980,945 | 9/1976 | Bickford | 375/1 |
| 4,142,155 | 2/1979 | Adachi | 375/51 |

Primary Examiner—Jin F. Ng

[57] ABSTRACT

In a system for frequency-diversity transmission, separate and distinct frequency carriers are obtained from the frequency modulation of an oscillator by a pure frequency with an index such that a certain number of Bessel lines thus obtained constitute a corresponding number of separate carriers. All the carriers are subsequently modulated by the information, then power-amplified in a single amplifier having a peak power equal to that of a single signal whose effective power would be the sum of those of the separate carriers. By means of this system, equipment for radio communication by tropospheric or ionospheric scatter propagation can be constructed in a simple manner and at low cost, with a high diversity order.

5 Claims, 3 Drawing Figures

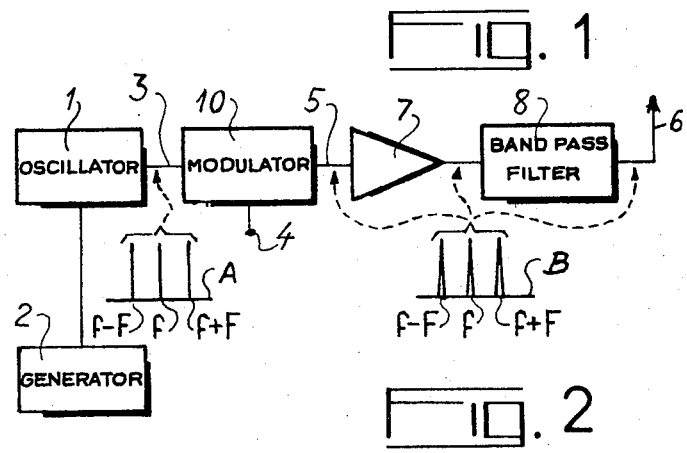
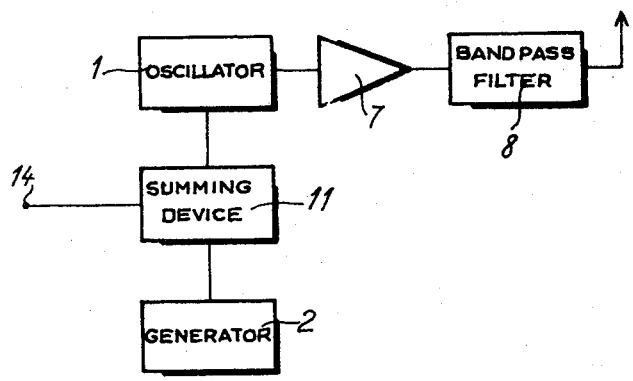
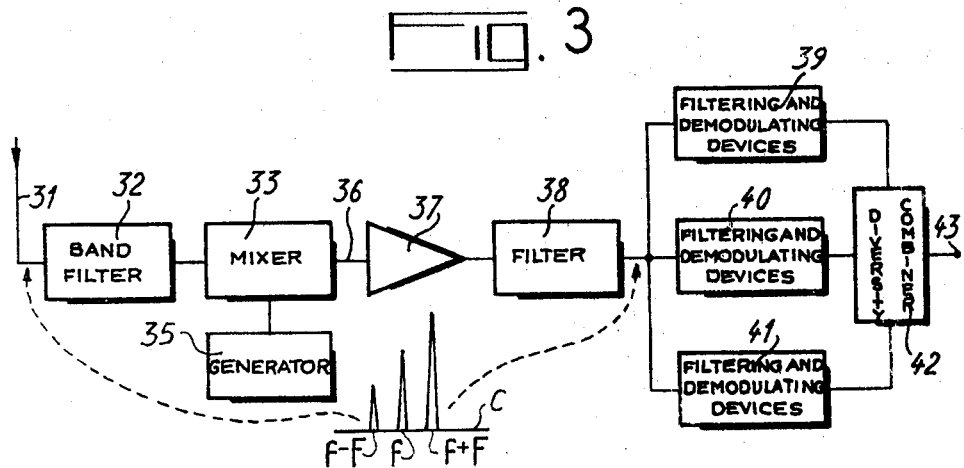

DIVERSITY RADIO TRANSMISSION SYSTEM HAVING A SIMPLE AND ECONOMICAL STRUCTURE

This invention relates to systems for diversity radio transmission, between two terminal stations, of high-frequency signals modulated by the information to be transmitted when the two stations are not in visibility, the radio link being established by tropospheric or ionospheric scatter propagation.

Radio links of this type are subject to highly variable propagation attenuation as a function of time. In order to ensure continuous transmission of information, it is not economically profitable and it even proves practically impossible in many instances to employ equipments having a sufficiently broad transmission margin to ensure a given minimum quality of communication during the maximum attenuation of propagation which may be encountered over a period corresponding to a very low percentage of the transmission time. One expedient accordingly consists in providing a plurality of transmission channels in parallel having characteristics which are sufficiently different from each other to ensure that the channels are not liable to be affected simultaneously by the same attenuation of propagation. There is thus obtained a diversity operation in which the signals of each channel are combined after automatic weighting adjustments in order to obtain at each instant a quality at least equal to that of the channel which exhibits the highest quality.

It is a known practice to employ, either separately or in combination, the modes of angle diversity, space diversity, frequency diversity, and so on. More recently, attention has been focused on time diversity which is usually applied to digital data transmissions and ensures redundancy in transmission of information at instants which are sufficiently far apart in order to benefit by different conditions of propagation.

It is readily apparent that this results in a substantial increase in the equipments employed and therefor in the cost of installations.

The present invention is more particularly concerned with frequency diversity, this transmission mode being one of those in most common use.

In order to utilize a frequency-diversity order N, it has proved necessary in the prior art to provide a radio link consisting not only of N receivers but also of N transmitters having the same power P as well as separate and distinct carrier frequencies. These N transmitters may comprise only one power amplifier but the peak power of this latter must be equal to $N^2P$ with a sufficient linearity to prevent excessive levels of intermodulation products.

The present invention is directed to a frequency-diversity transmission system comprising a structure of much more simple and economic design for the use of frequency diversity. Said structure may be employed alone or associated with the other diversity modes including frequency diversity in the conventional structure.

In accordance with the invention, there is provided a system for radio transmission of high-frequency signals modulated by the information to be transmitted between two terminal stations via a plurality of diversity propagation channels, each terminal station being equipped with at least one transmitter and one superheterodyne receiver. The transmitter essentially comprises a carrier-signal generator which is frequency-modulated by a signal having a frequency F delivered by an oscillator in accordance with an index so determined as to obtain from the spectrum produced by said modulation N spectral lines having closely related amplitudes, where N is a positive whole number greater than 1. Provision is made for a digital phase modulation device whose signal input is coupled to the output of the generator and whose modulation input is adapted to receive information signals whose highest frequency is lower than F. An amplifier is coupled to the output of the modulation device and followed by a bandpass filter having a bandwidth which is slightly greater than $(N-1)F$.

Other features of the invention will be more apparent to those skilled in the art upon consideration of the following description and accompanying drawings, wherein:

FIG. 1 is a general arrangement diagram showing a transmitter of the transmission system in accordance with the invention;

FIG. 2 is an alternate embodiment of FIG. 1 as applicable to frequency modulation by the information signals;

FIG. 3 shows one example of a general arrangement by a receiver of the transmission system in accordance with the invention.

In FIG. 1, an oscillator 1 which operates at a frequency f is frequency-modulated by generator 2 which produces a sine-wave signal having a frequency F; the oscillator output 3 is connected to a carrier input of a modulation device 10, the modulation input 4 of which receives the information to be transmitted and the output 5 of which is connected to an antenna 6 via an amplifier chain 7 followed by a bandpass filter 8.

The frequency-modulation index chosen for the generator 1 is equal to 1.435 in this example. There is consequently produced at the generator output 3 a spectrum of Bessel lines A in which the central line f and the lines of the first symmetrical sideband group $(F+F)$ have the same amplitude and concentrate 90% of the power delivered by the generator 1, within a frequency band equal to 2F.

The modulation device comprises a conventional digital phase modulator, the information to be transmitted being applied to said modulator in the form of binary pulse trains having a recurrence frequency which is distinctly lower than the frequency F.

It has been found by experiment that, at the output of the modulator 10, each line of the Bessel spectrum is modulated as if it were the only line in order to constitute the spectrum B without thereby modifying the preferential phase relation which exists between the spectral lines. In consequence, the amplifier 7 behaves with this spectrum of modulated lines in the same manner as it would behave with a single frequency-modulated signal.

It accordingly follows from the foregoing that in this example, the amplifier delivers a mean power P which is the sum of powers of each of three lines equal approximately to P/3 with a peak power equal to 2P whereas it would be equal to 6P if the lines resulted from different generators and were therefore decorrelated in phase.

The bandpass filter 8 is intended to limit the radiation of the antenna 6 solely to the three useful lines and therefore has a bandwidth of slightly greater value than 2F.

The foregoing remarks also apply to a modulation device comprising a frequency modulator of any known type. In this case also, experiments have demonstrated the fact that each line of the Bessel spectrum is modulated as if there were only one line. In the case of frequency modulation, this experimental fact is verified by calculation on the basis of the mathematical development of the expression of a wave frequency-modulated by the sum of two sine-wave signals which can be put in the form of the sum of lines of the Bessel spectrum relative to one of the signals, each line aforesaid being frequency-modulated by the other signal.

The following figure shows an example of frequency-modulation emission which applies the property discussed in the foregoing.

In FIG. 2, the same elements as those shown in FIG. 1 are designated by identical reference numerals. In this figure, the generator 2 is coupled to the oscillator 1 through a summing device 11, the information to be transmitted being applied to a second input 14 of said device.

One example of receiver which is designed to receive the signals thus emitted is shown in the following figure.

In FIG. 3, a mixer 33 is fed by an antenna —via a band filter 32 and is coupled to a local oscillation generator 35. The output 36 of said mixer 33 is connected through an amplifier 37 followed by a filter 38 to the inputs of three filtering and demodulating devices 39 to 41, the respective outputs of which are connected to a diversity combiner 42, the output 43 of which restitutes the transmitted information.

The elements 32 to 38 are those of a conventional receiver in which the intermediate-frequency signals are amplified within a band which is determined by the filter 38. By way of example, the selected bandwidth is slightly greater than 2F, which is the band of the spectrum transmitted by the transmitters described earlier.

The devices 39 to 41 serve to isolate and demodulate each component of the spectrum C of the three carriers received with variable relative amplitudes as a function of the separate and distinct propagation attenuations which they experience. In order to facilitate the filtering operation, an identical filter is provided for each device and preceded by a frequency converter, the bandwidth of this filter being slightly larger than the spectrum of each line.

The combiner 42 is of conventional type and continuously adds the three signals received with relative weighting of their levels as a function of their quality.

The transmitter and receiver described in the foregoing constitute a particularly simple and economical frequency-diversity transmission system since it contains only very few additional elements compared with a conventional single-carrier link.

The diversity order N which is equal to 3 in the example herein described can have any desired value and can in particular be equal to 5 with an index of modulation by the frequency F equal to approximately 1.8 since the five lines have closely related amplitudes in this case.

As can readily be understood, a system of this type is based on the assumption that it is employed in practice for guarding against propagation disturbances which are decorrelated in respect of relatively small carrier-frequency differences since the system otherwise becomes difficult to design and no longer offers the same attraction. However, studies carried out recently in this field have added to the knowledge of specialists who are now in a position to calculate with a high degree of accuracy the minimum frequency difference which is necessary and thus to derive maximum benefit from the devices described.

A particularly interesting and advantageous example of application relates to ionospheric propagation links in the decametric waveband, especially in which frequent selective-fading variations are decorrelated with frequency differences which are often smaller than the bandwidth of a telephone channel.

The simplicity of this system is such that it can also be applied to radio communications from moving vehicles.

In tropospheric scatter propagation in which a high diversity order is frequently employed, the system hereinabove described can be simply substituted for the transmitter-receiver sets of any transmission system having one or a number of different types of diversity, thus making it possible to multiply the initial diversity order by N in order to achieve enhanced quality of the radio link or alternatively, while maintaining the same quality, to reduce the performance of other elements, such as the power of the transmitters or the gain of antennae with a view to optimizing the cost of equipments. It is worthy of note that the system hereinabove described is compatible with conventional frequency diversity on condition that a sufficient frequency difference is provided for this latter.

This frequency-diversity transmission system is well suited to scatter links involving the use of only one antenna per terminal.

What is claimed is:

1. A system for radio transmission of high-frequency signals modulated by the information to be transmitted between two terminal stations via a plurality of diversity propagation channels, each terminal station being equipped respectively with at least one transmitter and one superheterodyne receiver, wherein the transmitter comprises a carrier-signal generator having a carrier signal output, an oscillator having a signal frequency F for frequency modulating said carrier signal according to a modulation index so determined as to produce a signal having a spectrum comprising N spectral lines having closely related amplitudes where N is a positive whole number greater than 1, a digital phase modulation device having a signal input coupled to the output of the generator and a modulation input adapted to receive information signals whose highest frequency is lower than the frequency F and an output, an amplifier coupled to the output of the modulation device and followed by a bandpass filter having a bandwidth which is slightly greater than $(N-1)F$.

2. A system for radio transmission of high-frequency signals modulated by the information to be transmitted between two terminal stations via a plurality of diversity propagation channels, each terminal station being equipped respectively with at least one transmitter and one superheterodyne receiver, wherein the transmitter comprises a carrier-signal generator having a carrier signal output, a summing device for summing a frequency F delivered by an oscillator and information signals whose highest frequency is lower than the frequency F to produce a composite signal for frequency modulating said carrier signal according to a modulation index, the modulation index being so determined as to produce when no information signals are present a signal having a spectrum comprising N spectral lines having closely related amplitudes where N is a positive whole number greater than 1, the transmitter being further provided with an amplifier coupled to the output of the separator and followed by a bandpass filter having a bandwidth which is slightly greater than (N−1)F.

3. A transmission system according to claim 1 or claim 2, wherein the receiver comprises in series input stages and an intermediate-frequency amplifier having a bandwidth which is slightly greater than (N−1)F, N circuits for filtering, amplifying and demodulating respectively each of the N lines, and a diversity combiner coupled to the outputs of the N circuits.

4. A transmission system according to claim 3, wherein the index is substantially equal to 1.435, N being equal to 3.

5. A transmission system according to claim 3, wherein the index is substantially equal to 1.8, N being equal to 5.

* * * * *